United States Patent [19]

Werkmeister

[11] 4,068,546
[45] Jan. 17, 1978

[54] FEED APPARATUS FOR SCREW MACHINE

[75] Inventor: Johannes Werkmeister, Reichenbach, Germany

[73] Assignee: Hagenuk Vormals Neufeldt & Kuhnke GmbH, Kiel, Germany

[21] Appl. No.: 709,283

[22] Filed: July 28, 1976

[30] Foreign Application Priority Data

Aug. 22, 1975 Germany .............................. 2537473

[51] Int. Cl.² ............................................. B23B 13/02
[52] U.S. Cl. ......................................... 82/1 C; 82/2.5; 214/1.2
[58] Field of Search ........................... 82/2.5, 1 C, 2.7; 214/1.1, 1.2, 1.3, 1.4, 1.5

[56] References Cited

U.S. PATENT DOCUMENTS 3,612,298 11/1971 Azuma ................................. 82/2.5 X
3,875,830 4/1975 Lechot .................................... 82/2.7

FOREIGN PATENT DOCUMENTS 1,117,968 11/1961 Germany ............................... 82/2.5

Primary Examiner—Leonidas Vlachos
Attorney, Agent, or Firm—Michael J. Strike

[57] ABSTRACT

A screw machine has a displaceable headstock and is provided with a pusher rod having at its front end a chuck that engages the rear end of a bar that passes axially through the headstock. This pusher rod is connected to a chain drive at least one of whose sprockets is connectable through a clutch to a gear meshing with a rack carried on the headstock. When this clutch is closed the headstock and pusher rod are positively locked together for joint displacement. During feed operations the two are disconnected so that the pusher rod can displace a new length of bar through the headstock, and the pusher rod may be arrested during backward displacement of the headstock in order to allow the chuck thereof to get new purchase on the bar.

10 Claims, 3 Drawing Figures

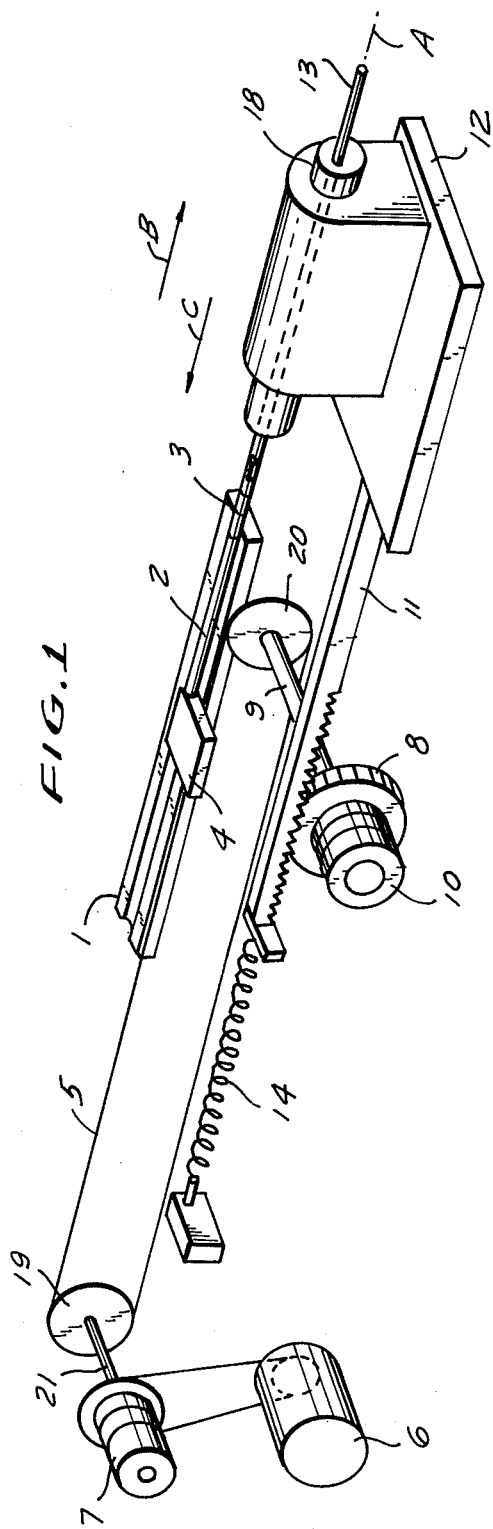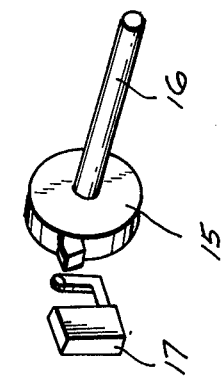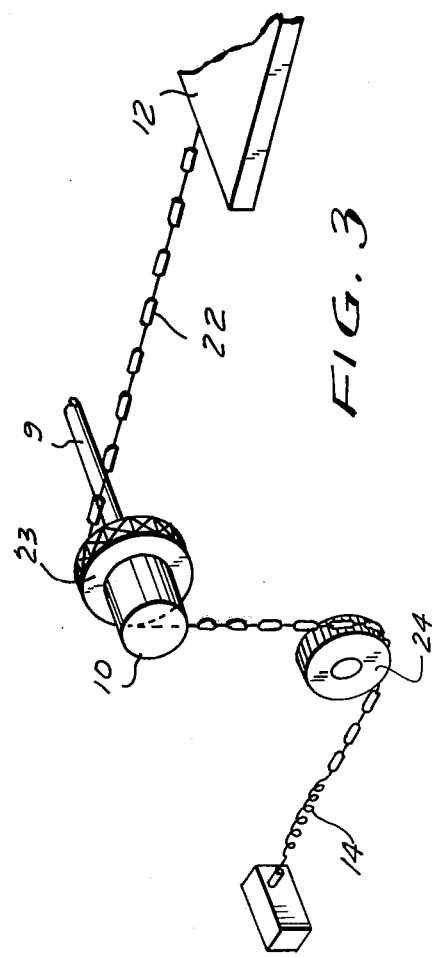

FEED APPARATUS FOR SCREW MACHINE

BACKGROUND OF THE INVENTION

The present invention relates to a method of and an apparatus for feeding a bar to an automatic lathe. More particularly this invention concerns a feed apparatus for a screw machine with a sliding headstock.

In a screw machine a bar is fed to the machining location through a hollow headstock between machining operations. In addition, with sliding headstock machines, the headstock moves axially, that is parallel to the elongation direction of the bar which also corresponds to the turning axis of the machine. Such an arrangement is in principle described in the commonly assigned patent application Ser. No. 594,285 filed July 9, 1975, now U.S. Pat. No. 4,006,654 and the references cited therein.

In such a feed apparatus typically a pusher rod is provided at its front end, that is its end turned toward the headstock, with a chuck, by which is meant any workpiece holder, whether of the collet, clamping-sleeve, or any other type, that holds the rear end of the bar rod. A chain drive connected via a releasable clutch to a motor has a chain connected to the pusher rod so as to axially advance the bar. A magazine is provided for loading in fresh bars when necessary and a two-part openable guide is provided for guidance of the bar even during rotation and for guidance of the pusher rod behind the bar.

In such devices the pusher rod typically pushes at all times on the rear end of the bar. Such constant pushing has the effect with small-diameter bars of occasionally bending them laterally and requiring the apparatus to be shut down and the bent bar removed. Furthermore such pushing frequently deflects the bar laterally out of the guide so as to make further feeding impossible. It should also be noted in this context that when very small clearance, often no more than 5 mm, is provided the chuck which is provided with a bearing so that it can connect the rotating bar with the nonrotating pushing rod, wears rapidly since in combination to this small-diameter bearing the rotational speed is extremely high to achieve optimal cutting speed.

It has been suggested to improve on the above-described type of drive by using a nonsynchronous motor having relatively low torque and considerable slip. The use of an electronically controlled direct-current motor has also been suggested in this regard. Both systems have the considerable disadvantage that they exert uneven pressure on the rear end of the bar. Furthermore, such systems rarely are able to exert sufficient force to remove the tail end of a bar from the headstock after a machining operation when the remaining piece is insufficiently long to form another workpiece. Thus it is essential in such installations that a separate extracting arrangement be provided, thereby increasing equipment investment.

A relatively sure system has been designed which uses a sleeve that grips the bar immediately behind the headstock. Such an arrangement, although relatively sure in operation, is very complicated and, therefore, greatly increases the cost of the automatic lathe. Furthermore any device which is rotationally coupled to the bar behind the headstock must also be rotated by the headstock so that the torsion load on the headstock is increased considerably. Thus any type of arrangement which increases the mass of the bar behind the headstock will lead to premature wearing out of this headstock.

Various prior-art suggestions can be seen in Swiss Pat. No. 551,828, German published specifications Nos. 1,402,279 and 2,362,130 as well as in German published application No. 1,117,968.

SUMMARY OF THE INVENTION

It is therefore an object to provide an improved method of and apparatus for feeding a bar to a lathe with a sliding headstock.

Another object is the provision of such an apparatus which frees the lathe headstock from any unnecessary loads.

Another object is to provide such an apparatus which is relatively simple and can be added to an existing lathe without considerable rebuilding thereof.

These objects are attained according to the present invention in a bar feed apparatus having releasable means connected between the drive means for the pusher rod and the headstock for positively linking this headstock and the pusher rod together for joint axial displacement thereof. In accordance with this invention the drive means includes a wheel, a flexible element spanned over the wheel and secured to the pusher rod, and a shaft carrying and rotatable with the wheel. The headstock is connectable through a clutch to this shaft for synchronous axial displacement of the headstock and the pusher rod jointly. Thus in accordance with this invention once the bar is properly positioned in the headstock and the headstock has properly gripped it, the pusher rod and headstock move together synchronously, without the bar having to pull or push the pusher rod.

According to another feature of this invention, the releasable means includes a rack fixed to the headstock, a gear meshing with this rack and rotatable thereby on axial displacement of the headstock, and the above-mentioned clutch between the gear and the shaft. It is also possible in accordance with this invention to replace the rack with a chain and to replace this gear with a sprocket.

In accordance with the method of the present invention the headstock and the shaft that rotates to move the pusher rod and in turn displaces the bar along the axis through the axially displaceable headstock is positively linked to the headstock for synchronous axial displacement of the headstock and the pusher rod jointly during machining operation. Between machining operations the shaft and the headstock may be disconnected for workpiece feed and withdrawal of the headstock to a back or starting position. Furthermore, the shaft may be rotationally arrested during backward displacement of the headstock toward the pusher rod between machining operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective largely diagrammatic view of the system according to this invention, FIG. 2 is a perspective view of a detail of the lathe of FIG. 1, and FIG. 3 is a perspective view of a variation on the apparatus of FIG. 1.

SPECIFIC DESCRIPTION OF PREFERRED EMBODIMENTS

As is shown in FIG. 1, the lathe has a headstock 12 displaceable forwardly along an axis A in a direction B and backwardly along this axis in a direction C. The headstock 12 is hollow and is adapted to receive a rod bar 13 that can pass axially through it and be clamped by a collet 18.

The rear end of the bar 13 is secured by means of a clamping sleeve or chuck with a bearing 3 to the front end of a pusher rod 2 aligned on the axis A and lying in a guide 1. The pusher rod 2 is connected to a feed chain 5 by a block 4. This block 4 is carried on a chain 5 spanned over a front sprocket 20 carried on a rotatable but otherwise fixed shaft 9 and a rear sprocket 19. A shaft 21 carrying the rear sprocket 19 is connected via a releasable electrical clutch 7 to a continuously rotating motor 6.

The headstock 12 carries a rearwardly axially extending rack 11 meshing with a gear 8 that is connectable via a combined clutch and brake 10 to the shaft 9. The rear end of the rack 11 is urged backwardly in direction C by a spring 14 whose rear end is fixed. The combined brake-clutch 10 can either rotationally couple the gear 8 and sprocket 20 together or can let these two members rotate relative to each other while rotationally arresting the shaft 9.

FIG. 3 shows how the rack 11 can be replaced by a chain 22 engaged over a sprocket 23 and taking the place of the gear 8. The other end of the chain 22 is connected to a weight 24.

The brake-clutch 10 is controlled by the switch 17 (FIG. 2) operated through a cam 15 and carried on the control shaft (cam shaft) 16 of the lathe having the headstock 12.

In accordance with this invention the bar 13 is fed in direction B through the headstock 12 by closing the clutch 7 and decoupling the sprocket 20 from the gear 8. Once the desired length of bar has been fed through the headstock 12 the collet 18 thereon is clamped on the bar and the clutch/brake 10 is operated so as to rotationally couple the sprocket 20 and gear 8. These elements are of identical effective diameter so that axial displacement in direction B or C of the headstock 12 will automatically synchronously displace the pusher rod 2 in the same direction and with the same stroke.

When the machining operation is over the clutch/rake 10 is operated so as to disconnect the sprocket 20 from the gear 8 and simultaneously to rotationally arrest the sprocket 20. Thereupon the spring 14 can pull the headstock 12 backwardly to a starting position.

It will be understood that each of the elements described above, or two or more together, may also find a useful application in other types of system differing from the types described above.

While the invention has been illustrated and described as embodied in a feed apparatus for screw machines with a sliding headstock, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A bar feed apparatus for a lathe having a headstock displaceable axially forwardly and backwardly, said apparatus comprising:

a pusher axially displaceable adjacent said headstock;

means including a chuck rotatable on said pusher for holding a bar extending axially through said headstock and for coupling said pusher to a bar held in said chuck for joint axial displacement forwardly and backwardly;

drive means couplable to said pusher for displacing same axially forwardly toward said headstock and thereby displacing a bar held in said chuck through said headstock; and releasable means connected between said pusher and said headstock for positively linking same together for joint synchronous axial displacement thereof forwardly and backwardly.

2. The apparatus defined in claim 1 wherein said drive means includes a wheel, a flexible element spanned thereover and secured to said pusher, and a shaft carrying and rotatable with said wheel, said releasable means being connected to said shaft.

3. The apparatus defined in claim 2 wherein said flexible element is a chain and said wheel is a sprocket.

4. The apparatus defined in claim 1 wherein said releasable means includes a rack fixed to said headstock, a gear meshing with said rack and rotatable thereby on axial displacement of said headstock, and a clutch between said gear and said shaft.

5. The apparatus defined in claim 4, further comprising means for arresting said shaft when same is uncoupled by said clutch from said gear.

6. The apparatus defined in claim 5, further comprising a guide for said pusher and said workpiece.

7. The apparatus defined in claim 2 wherein said releasable means includes a chain having an end secured to said headstock, a sprocket engaging said chain, and a clutch between said sprocket and said shaft.

8. In a method of operating a screw machine wherein a shaft is rotated to move a pusher rod that in turn displaces a bar forwardly along an axis through a headstock axially displaceable forwardly and backwardly, the improvement comprising the step of positively linking said headstock to said shaft and thereby coupling said headstock and said pusher rod for joint and synchronous axial movement forwardly and backwardly during machining operations.

9. The improvement defined in claim 8, further comprising the step of disconnecting said shaft from said headstock during workpiece feed operations.

10. The improvement defined in claim 9, further comprising the step of rotationally arresting said shaft during backward displacement of said headstock toward said pusher rod between machining operations.

* * * * *